United States Patent [19]

Meester

[11] Patent Number: 5,197,269

[45] Date of Patent: Mar. 30, 1993

[54] VINE SEPARATION SYSTEM

[75] Inventor: David J. Meester, Fresno, Calif.

[73] Assignee: FMC Corporation, Chicago, Ill.

[21] Appl. No.: 725,709

[22] Filed: Jul. 3, 1991

[51] Int. Cl.⁵ .......................................... A01D 46/00
[52] U.S. Cl. .................................... 56/327.1; 56/328.1
[58] Field of Search ............... 56/327.1, 328.1, 12.8, 56/228, 153

[56] References Cited

U.S. PATENT DOCUMENTS

| | | | |
|---|---|---|---|
| 3,413,789 | 12/1968 | Studer | 56/330 |
| 3,916,913 | 11/1975 | Looker et al. | 56/327.1 X |
| 3,986,561 | 10/1976 | Bettencourt et al. | 171/14 |
| 4,147,017 | 4/1979 | Cortopassi et al. | 56/16.5 |
| 4,157,005 | 6/1979 | Orlando et al. | 56/228 |
| 4,232,506 | 11/1980 | Studer | 56/327 |
| 4,234,045 | 11/1980 | Porter | 171/14 |
| 4,335,570 | 6/1982 | Fitzmaurice | 56/327 |
| 4,472,928 | 9/1984 | Easton | 56/220 |
| 4,936,082 | 6/1990 | Majkrzak | 56/220 |
| 4,956,966 | 9/1990 | Patterson | 56/181 |
| 5,099,636 | 3/1992 | Yoder | 56/327.1 |

OTHER PUBLICATIONS

Brochure for a Johnson Tomato Harvester illustrates a tomato harvester sold by Johnson Farm Machinery Company.
Brochure for a Johnson All New Tomato Harvester illustrates a tomato harvester sold by Johnson Johnson Farm Machinery Company.
Stout, B. A. and Ries, S. K. 1960 Development of a Mechanical Tomato Harvester.
Agricultural Engineering 41(10): pp. 682-685 Discloses a historal development of a Tomato Harvester.
Lorenzen, Coby & Hanna, G. C. 1962, Mechanical Harvesting of Tomatoes, Agricultural Engineering 42(1): pp. 16-18 discloses approaches to shaking tomatoes off of vines.
Hood, C. E., Webb, B. K., Alper, Y., Sims Jr., E. T., & Jobes, R. A. 1975 A New Fresh Market Tomato Harvesting System, Transactions of the ASAE 18(6), pp. 1021-1026 discloses a tomato harvesting system for fresh market tomatoes.
Alper, Y., Hood C. E., & Webb, B. K. 1976 A Two-Dimensional Shaker for Harvesting Fresh Market Tomatoes, Transactions of the ASAE 19(5): pp. 830-839 discloses the use of two dimensional shaking to shake tomatoes off of vines.
Adekoya, L. & Studer H. E., 1979 A Rotary Shaker For Harvesting Tomatoes For Presentation At The 1979 Summer Meeting Of ASAE And CSAE, Paper No. 79-1060 discloses a tomato harvesting system.

*Primary Examiner*—Terry Lee Melius
*Attorney, Agent, or Firm*—Michael Lee; R. C. Kamp

[57] ABSTRACT

The invention provides an improved method and apparatus for separating fruits, such as tomatoes, from vines. The invention provides a tined reel which separates vines to allow disengaged fruit caught between the vines to be released. In addition, the invention provides a blowing and pinching means to blow and pull vines from the collected fruit. The invention also provides feeder bars which direct vines to a shaker brush and provides improved separation.

15 Claims, 5 Drawing Sheets

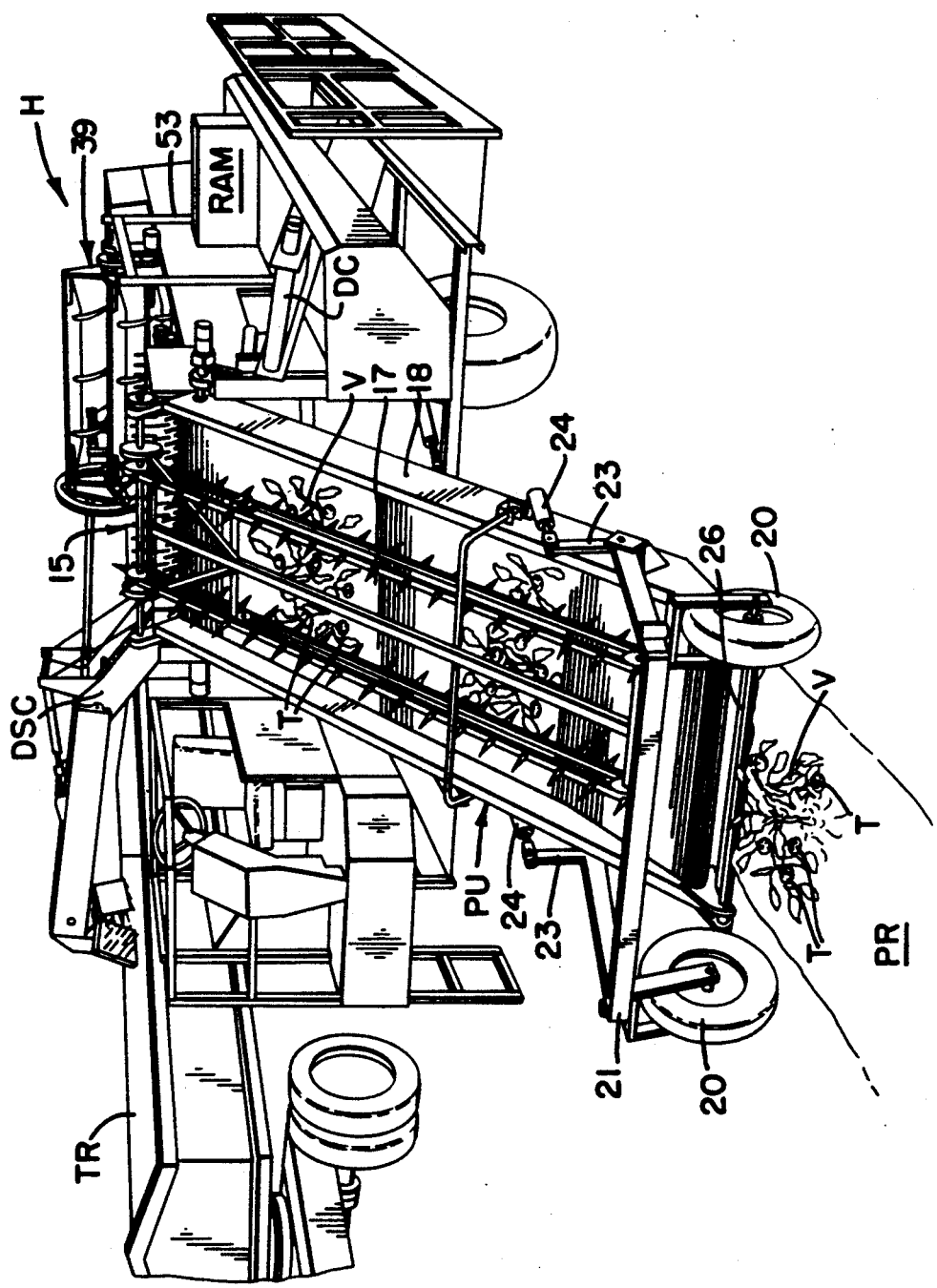

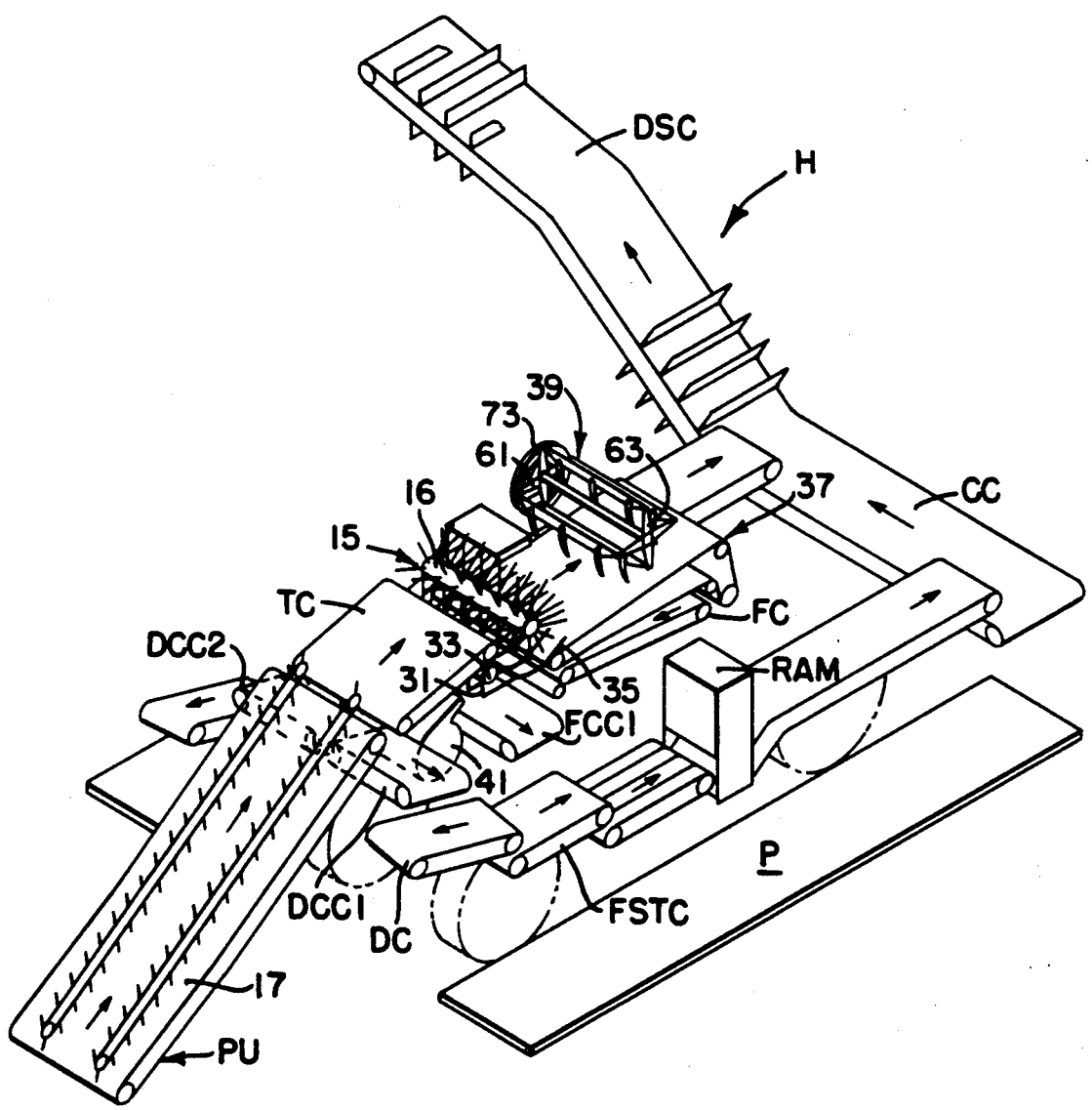
FIG_2

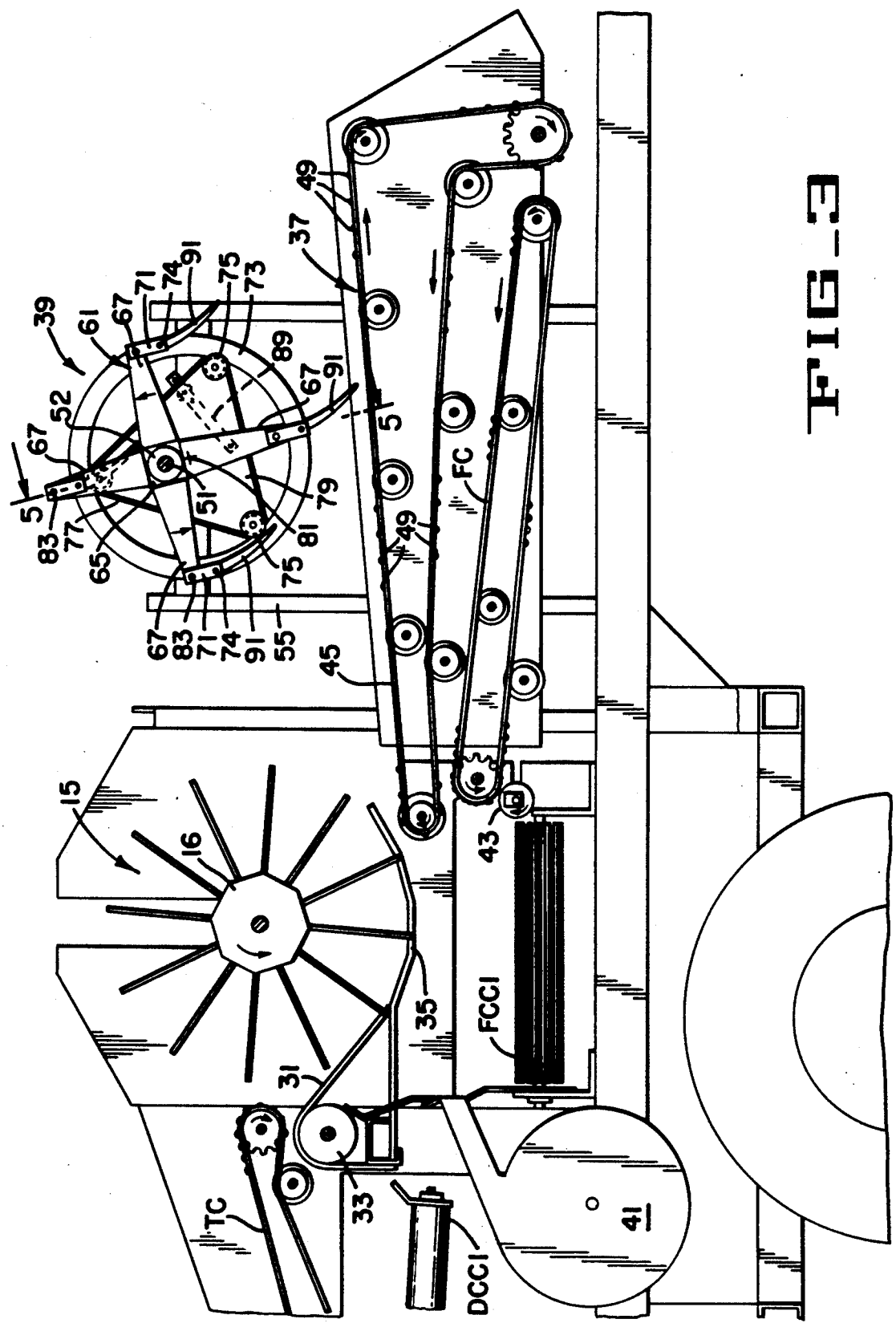
FIG_3

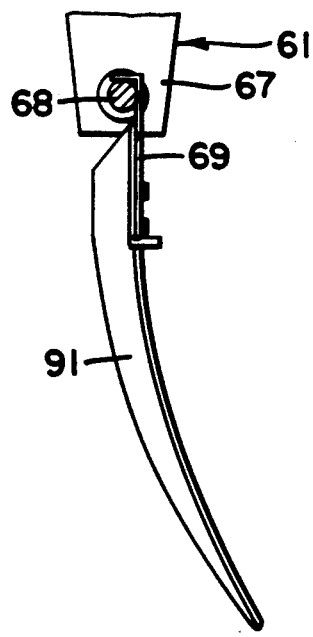
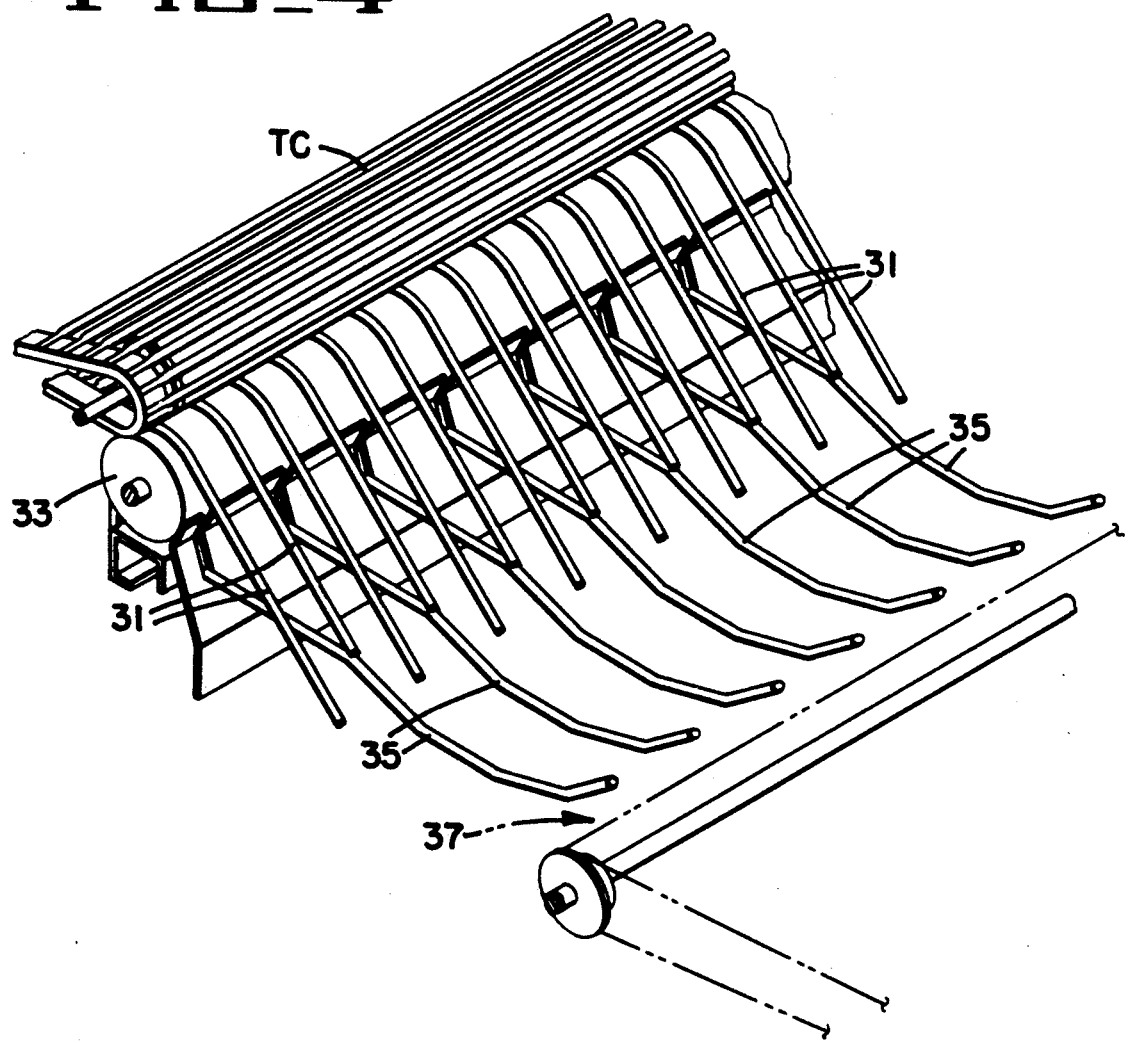

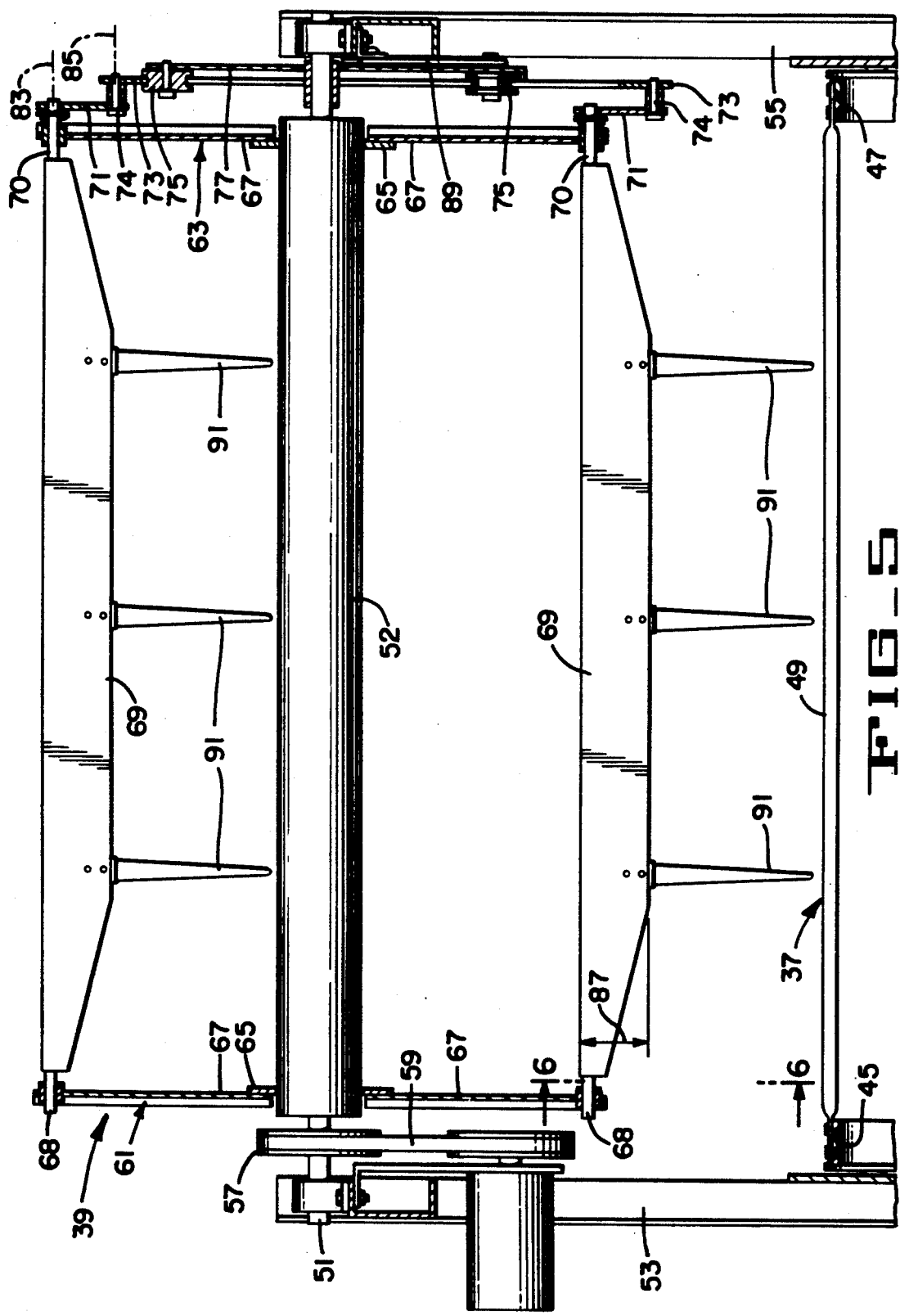

VINE SEPARATION SYSTEM

This invention generally relates to apparatus for harvesting above-ground vegetable crops, such as tomatoes. More particularly, the present invention concerns harvesters of the type which include a shaking mechanism for removing fruit from the vine and means for collecting said fruit.

Direct-loading harvesters have been known in the art for many years and have recently enjoyed wide-spread use in the harvesting of tomatoes Typically, such harvesters are arranged to harvest tomato plants grown in rows, to elevate the harvested plants to shaker conveyors for separating tomatoes from their vines, to carry the tomatoes from the shaker conveyors to sorter conveyors where undesired tomatoes and trash are removed, and finally to elevate the remaining tomatoes from the harvester to an attendant truck or trailer for delivery to processing plants.

The invention provides an improved method and apparatus for separating tomatoes or other vegetable crops from vines and leaves. The invention provides rigid and bent linear feeder bars to a shaker head assembly, which provides the improved feeding of vines to the shaker assembly and the improved separation of tomatoes or other vegetable crops from the vines. The invention also provides a tined means to separate vines to allow tomatoes caught between the vines to be released. In addition, the invention provides a blowing and pinching means to blow and pull vines and leaves away from the tomatoes FIG. 1 is a perspective view of a tomato harvester using a preferred embodiment of the invention.

FIG. 2 is a schematic representation of a tomato harvester using a preferred embodiment of the invention, illustrating the paths taken by the tomatoes, vines and debris after they are harvested.

FIG. 3 is a central section of part of the harvester illustrated in FIGS. 1 and 2.

FIG. 4 is a perspective view of feeder bars, shaker bars, moving roller, and a transfer conveyor used in the preferred embodiment illustrated in FIG. 1.

FIG. 5 is a section taken along lines 5—5 of FIG. 3.

FIG. 6 is a fragmentary section taken along lines 6—6 of FIG. 5.

The preferred embodiment of the present invention is used in a tomato harvesting machine H, as illustrated in FIG. 1. The tomato harvesting machine H is adapted to harvest tomatoes T from vines V grown in a row on an elongate planting ridge PR. The harvesting machine H is designed to proceed along the planting ridge PR, sever the tomato vines V near ground level, elevate the vines for further processing, separate the tomatoes from the vines, and transfer the tomatoes to an awaiting truck TR.

The tomato harvesting machine H includes a pickup mechanism PU comprising a pickup conveyor 17 mounted in a header frame 18, said header frame being pivotally attached to the main frame of the harvester H. The front end of the header frame 18 is supported by a pair of wheels 20 mounted on a U-shaped support frame 21 which is pivotally attached to the front end of said header frame. A pair of lever arms 23 extend upward from the U-shaped support frame 21 and are adapted to raise and lower said support frame with respect to the front end of the header. A pair of hydraulic piston and cylinder assemblies 24 are attached to the distal ends of the lever arms 23 at the piston rod and to the header frame 18 at the cylinder end. Actuation of the cylinder assemblies 24 allows the distance that the front end of the pickup mechanism PU travels above the ground to be adjusted.

A cutting means is provided at the front end of the pickup mechanism PU to sever the tomato vines at or near the ground level. The cutting means may be of various types, and a rotating cutting bar 26 is illustrated in FIG. 1. The cutting bar 26 is rotatably attached at both ends to the header frame 18 and is rotated by a hydraulic motor (not shown). As the harvester H is driven forward, the cutting bar 26 encounters the individual vines V and severs them near the ground. After severing, the vines V fall onto the pickup conveyor 17 and are elevated for further processing on the main frame of the harvester, as will be described hereinafter.

Referring to FIG. 2, the overall operation of the tomato harvester H will now be described in general terms. A longitudinal transfer conveyor TC is adapted to receive the tomatoes T and vines V from the pickup conveyor 17. There is a small gap between the discharge end of the pickup conveyor 17 and the receiving end of the transfer conveyor TC which allows loose tomatoes, dirt clods and other debris to drop from the vines in transit. These loose tomatoes and debris fall onto one of two short, cross conveyors DCC1, DCC2 which transfer them to the left side and the right side, respectively, of the harvester H (FIG. 2). It should be noted that the further processing undergone on both sides of the harvester H is identical and that such processing will be described only for the left side of the machine which is fed by cross conveyor DCC1.

The tomatoes, dirt and other debris are discharged from DCC1 onto an inclined, longitudinal dirt conveyor DC which is adapted to permit loose tomatoes to roll down the conveyor while the dirt and other debris are conveyed upward and discharged from the harvester. The tomatoes fall from dirt conveyor DC to a front sorter conveyor FSTC positioned at the rear end of the dirt conveyor DC. Sorters, who stand on platform P, manually remove undesirable tomatoes and dirt that may have reached the front sorter conveyor FSTC.

The transfer conveyor TC discharges vines V with attached tomatoes T to a set of feeder bars 31 composed of a plurality of stationary parallel bars which on a first end are wrapped around a moving roller 33 and on a second end are straight and angled downward as shown. The feeder bars 31 direct the vines under a shaker head assembly 15, which comprises a shaker brush 16, a means for rotating the shaker brush 16, and a means for vibrating the shaker brush 16. The vines are moved by the shaker head assembly from the feeder bars 31 over a set of shaker bars 35. The shaker head assembly 15 is positioned to engage the vines supported on the shaker bars 35. The shaker bars 35 are a set of parallel straight bars with a few bends of approximately 15 degrees. The feeder bars 31 and shaker bars 35 will be more particularly described below.

Some of the tomatoes T which have been disengaged by the shaker head assembly 15 fall through the openings between adjacent shaker bars 35 onto either of two cross conveyors FCC1 and FCC2. Other tomatoes T which have been disengaged by the shaker head assembly 15 are caught between vines V, and are not able to reach the openings between the shaker bars 35.

The vines V are pushed by the driven shaker assembly 15 from the shaker bars 35 onto a separation conveyor 37. The separation conveyor 37 comprises a pair of flexible belts with metal rods running from one flexible belt to the other. The separation conveyor 37 will be more particularly described below.

The separation conveyor 37 causes the vines V with loosened tomatoes T to pass below a vine reel 39. The vine reel 39 separates the vines and allows tomatoes T to fall through the vines V and through the separation conveyor 37 to a fruit conveyor FC, located beneath the separation conveyor 37. The vine reel 39 forms an inventive aspect of the invention and shall be described in more detail below. The remaining vines V are conveyed by the separation conveyor 37 to the rear of the harvester H, where they are allowed to fall to the ground.

The fruit conveyor FC carries the tomatoes forward on the harvester H and discharges them onto either of the two cross conveyors FCC1 and FCC2, with only the cross conveyor FCC1 being shown in FIG. 2. It should be noted that a number of the tomatoes fall directly onto the cross conveyors from the shaker bars 35, since the fruit conveyor FC does not extend fully forward.

Mixed with the fruit that is discharged to the two cross conveyors FCC1 and FCC2, are leaves, vines V and dirt. To provide further separation a blower 41 is provided where the width of the blower 41 is substantially equal to the width of the fruit conveyor FC. The blower directs air over the two cross conveyors FCC1 and FCC2 and to the bottom of the shaker bars 35. From there, some of the air passes between the bottom of the fruit conveyor FC over a pinch roller 43. Leaves, vines V and dirt are blown from the two cross conveyors FCC1 and FCC2, with the leaves and vines V being pinched between and removed by the fruit conveyor FC and the pinch roller 43, thus providing additional separation. The blower 41 and the pinch roller 43 form an inventive aspect of the invention and shall be described in more detail below.

The fruit which has fallen onto cross conveyor FCC1 is discharged onto front sorter conveyor FSTC where it joins the fruit directed there by the inclined dirt conveyor DC. The fruit which is fallen onto the other cross conveyor FCC2 is discharged to the other side of the machine where it joins the second processing line. The tomatoes discharged from the front sorter conveyor FSTC, having been manually and mechanically sorted to remove unsuitable tomatoes and debris, are directed to an automatic color sorter RAM where further undesirable tomatoes may be ejected from the harvester H.

The inspected tomatoes are then discharged onto the cross feed conveyor CC where they join the inspected tomatoes from the other side of the harvester H, all tomatoes then being directed to the right hand side of the harvester H. From the cross conveyor CC, the tomatoes are directed to the discharge conveyor DSC where the tomatoes are elevated and discharged into a receiving truck TR (FIG. 1) which travels alongside the harvester H.

FIG. 3 illustrates a cut away side view of the feeder bars 31, the shaker head assembly 15, the shaker bars 35, and the moving roller 33. FIG. 4 illustrates a perspective view of the feeder bars 31, the shaker bars, the moving roller 33, and the transfer conveyor TC with the shaker head assembly 15 removed. As described above, the feeder bars 31 are composed of a plurality of rigid parallel stationary bars which on a first end are wrapped around a moving roller 33 and on a second end are straight and angled downward as shown. The feeder bars 31 are angled between 30° and 60° from the horizontal plane. The shaker brush 16, which is a rotating cylindrical brush, is positioned to engage the vines on the feeder bars 31. Because the feeder bars 31 are straight and rigid, they direct the vines into the shaker brush 16, and the path of the air from the blower. By pushing the vines V further into the shaker brush 16, an improved separation is achieved. The shaker brush 16 moves the vines from the feeder bars 31 to the shaker bars 35. The shaker bars 35 are a set of parallel straight rigid and stationary bars with a few bends of approximately 15° and less than 20°, which are easier to manufacture and maintain than flexible arcuate rods. The spacing between the parallel shaker bars 35 is approximately equal to twice the spacing between the feeder bars 31 to allow any dirt clods that pass through the feeder bars 31 to pass through the shaker bars 35.

As described above, the shaker head assembly 15 shakes the tomatoes off of the vines V, allowing some of the tomatoes to fall through the shaker bars 35, and then pushes the vines V onto the separation conveyor 37. FIG. 5 illustrates the section taken along lines 5—5 of FIG. 3. As illustrated in FIGS. 3 and 5, the separation conveyor 37 comprises a first belt 45 and a second belt 47 with a plurality of metal rods 49 extending in parallel there between. The plurality of rods 49 are spaced apart to allow tomatoes to pass between the rods 49 to the fruit conveyor FC below the separation conveyor 37. The fruit conveyor also comprises a first belt and a second belt with a plurality of metal rods extending in parallel there between. In the preferred embodiment, the spacing between the metal rods 49 of the separation conveyor 37 is twice the distance of the spacing between the metal rods of the fruit conveyor.

The separation conveyor 37 passes the vines under a vine reel 39, illustrated in FIGS. 1,2,3, and 5. The vine reel 39 is mounted on a shaft 51, upon which the vine reel 39 rotates. A first end of the shaft 51 is mounted on a first frame member 53. A second end of the shaft 51 is mounted on a second frame member 55. A drive sheave 57 is mounted on the first end of the shaft, and is driven by a fan belt 59 driven by a motor. The fan belt 59 rotates the drive sheave 57, which rotates the shaft 51. A reel drive 52, which surrounds a significant length of the shaft 51, is attached to the shaft 51 and driven by the shaft 51. A first cross shaped reel arm 61 is connected to the reel drive 52 near the first end of the shaft 51, and is rotated by the reel drive 52. A second cross shaped reel arm 63, is connected to the reel drive 52 near the second end of the shaft 51, and is rotated by the reel drive 52. Each cross shaped reel arm 61,63 has a center 65 and four arms 67. The shaft 51 and the reel drive 52 pass through the center 65 of each reel arm 61,63. At the end of each arm 67 are bats 69. Each bat 69 extends between the first reel arm 61 and the second reel arm 63. A first set of bat shafts 68, which have first ends which extend through the first reel arm 61 and second ends which are connected to first ends of the bats 69, are set to allow the first set of bat shafts 68 to rotate with respect to the first reel arm 61 and to cause the first set of bat shafts 68 to rotate with the bats 69. A second set of bat shafts 70, which have first ends which extend through the second reel arm 63 and second ends which are connected to second ends of the bats 69, are set to allow the second set of bat shafts 70 to rotate with respect to the second reel arm 63 and to cause the second set of bat shafts 70 to rotate with the bats 69.

At the first ends of each of the second set of bat shafts 70 on the opposite side of the second cross shaped reel arm 63 from the bats 69 are flanges 71, where a flange 71 is connected to a bat shaft 70 in a manner so that a bat shaft 70 will rotate with the flange 71 connected to the bat shaft and wherein each flange 71 is connected with the bat shaft at a first end of the flange 71. The second end of each flange 71 is connected to a ring 73 by a pin 74. In the preferred embodiment, the ring 73 is mounted on three rollers 75. The rollers 75 are mounted on a reel cam 77. The centers of the three rollers 75 designate the vertices of a triangular area 79 on the reel cam 77. In this embodiment, the triangle formed by the centers of the three rollers 75 is an equilateral triangle. The center 81 of the triangular area 79 is offset from the center 65 of the reel arms 61,63 so that the shaft 51 passes through the triangular area 79 a set distance from the center 81 of the triangular area 79. In this embodiment, the length of a first vector between the center 81 of the triangular area 79 and the center of the shaft is substantially equal to the length of a second vector between the center 83 of a bat shaft 70 connected to the flange 71 and the center 85 (FIG. 5) of a pin 74 that connects the flange 71 to the ring 73. In addition, the first vector is substantially parallel to the second vector. Therefore, the angle of the second vector can be changed by changing the angle of the first vector. Since the second vector lies substantially along the length of the flanges 71, the lengths of the flanges 71 are substantially parallel to the second vector, and the angle of the lengths of the flanges 71 are changed when the angle of the second vector is changed. Since the angle of the bats 69 are changed when the angle of the flanges 71 are changed, the angle of the bats 71 are affected by the alignment of the center 65 of the reel arms 61,63 and the center 81 of the triangular area In this embodiment, the widths 87 (FIG. 5) of the bats 69 are parallel to the first vector and the lengths of the flanges 71.

An adjustable support means 89 is connected between the reel cam 77 and the second frame member 55. The adjustable support allows the reel cam 77 to be rotated to vary the angle of the first vector and once the first vector is at a desired angle, to hold the reel cam 77 in the desired position.

FIG. 6 is a fragmentary section taken along lines 6—6 of FIG. 5. A plurality of tines 91 are attached to the bats 69. The tines 91 have a length which is substantially parallel to the width 87 of the bats 69. Therefore, the direction of the length of the tines 91 can be adjusted by rotating the reel cam 77.

In operation, the separation conveyor 37 passes vines V and loosened tomatoes T, which are caught among the vines V, under the vine reel 39. The separation conveyor 37 rotates in a clockwise direction as indicated in FIG. 3, to carry the vines from the shaker bars 35 over the top of the separation conveyor 37. The reel cam 77 has been rotated so that the first vector is substantially vertical, making the second vector, the length of the flanges 71, the widths 87 of the bats 69, and the lengths of the tines 91 substantially vertical The vine reel 39 is driven so that the tangential velocity of the bats 69 is approximately twice the velocity of the separation conveyor 37. The vine reel 39 is rotated in a counter clockwise direction as indicated so that near the separation conveyor 37 the tines 91 move in the same direction as the separation conveyor 37. As viewed in FIG. 3, the tines 91 on the left side of the vine reel 39 enter the vines in a substantially vertically downward direction with a substantially zero velocity along the direction of movement of the separation conveyor 37. The tines 91 on the bottom of the vine reel 39 pass over the separation conveyor 37 with a velocity along the direction of movement of the separation conveyor 37, which is substantially twice the velocity of the separation conveyor, and with a vertical velocity of substantially zero. As viewed in FIG. 3, the tines 91 on the right side of the vine reel 39 leave the vines in a substantially vertically upward direction with a substantially zero velocity along the direction of movement of the separation conveyor 37. Therefore, as the tines 91 move from left to right under the vine reel 39, as viewed in FIG. 3, the tines 91 go from a substantially zero velocity along the direction of the separation conveyor 37, to twice the velocity of the separation conveyor 37 along the direction of the separation conveyor 37, to a substantially zero velocity along the direction of the separation conveyor 37. The change in velocity of the tines 91 with respect to the movement of the separation conveyor 37, causes the vines V which engage the tines 91 to be agitated and separated allowing loosened tomatoes T, which are caught between the vines V, to escape from between the vines V and to fall between the metal rods 49 of the separation conveyor 37 to the fruit conveyor FC. By keeping the tines 91 substantially vertical, the tines 91 can be easily inserted into and removed from the vines V, and are useful in separating the vines V. Other embodiments may replace the reel cam 77, rollers 75, and ring 73 with bearings and bearing tracks to provide a varied tine orientation.

The fruit conveyor FC conveys the tomatoes and leaves or vines or dirt which fall through the separation conveyor 37 towards the front of the harvester H above the front cross conveyors FCC1 and FCC2. The tomatoes, vines and leaves drop from the fruit conveyor FC to the front cross conveyors FCC1 and FCC2. In addition, as described above, tomatoes, vines V, leaves, and dirt drop through the shaker bars 35 towards the front cross conveyors FCC1 and FCC2. The blower 41, which blows air, has an opening along the lengths of the front cross conveyors FCC1 and FCC2. The air from the blower 41 is directed along the length of the front cross conveyors FCC1 and FCC2 from the blower 41 to the shaker bars 35. Vines V in the shaker bars 35 deflect the air from the shaker bars 35 to a location under the fruit conveyor FC. The air from the blower 41, pushes vines V and leaves from above the front cross conveyors FCC1 and FCC2 to the fruit conveyor FC and the pinch roller 43 located under the fruit conveyor FC. The fruit conveyor FC rotates in a counter clockwise direction as shown in FIG. 3. The pinch roller 43 rotates in a clockwise direction. Vines V and leaves blown between the pinch roller 43 and the fruit conveyor FC are pulled by the pinch roller 43 and fruit conveyor FC and removed from the harvester H. The pinch roller 43 in this embodiment has a smooth surface. It may be desirable to have a rubber or some such gripping surface on the pinch roller 43.

While a preferred embodiment of the present invention has been shown and described herein, it will be appreciated that various changes and modifications may be made therein without departing from the spirit of the invention as defined by the scope of the appended claims.

What is claimed is:

1. A harvester for harvesting and separating fruits from vines, comprising:

means for cutting the vines;
means for disengaging the fruits from the vines;
a separation conveyor for conveying disengaged fruits and vines in a first direction;
a vine reel located above the separation conveyor for providing separations between vines, comprising:
a reel frame wherein the reel frame comprises
a first reel arm on the first side of the separation conveyor, wherein the first reel arm rotates around the axis;
a second reel arm on the second side of the separation conveyor, wherein the second reel arm rotates around the axis; and
a plurality of bats that extend substantially from the first reel arm to the second reel arm; and
a plurality of tines, wherein the tines are connected to the bats and wherein the bats are able to rotate with respect to the first and second reel arms;
means for allowing the vine reel to rotate around an axis extending from a first side of the separation conveyor to a second side of the separation conveyor; and
means for driving the vine reel to rotate around the axis.

2. A harvester as claimed in claim 1, further comprising means for maintaining the tines at a set angle from the vertical position as the vine reel is rotated.

3. A harvester as claimed in claim 2, wherein the means for maintaining the tines at a set angle, comprises:
a plurality of flanges with first ends and second ends, wherein each bat is mechanically connected to a first end of a flange so that when the flange is rotated the bat is rotated;
a ring;
means for connecting a second end of a flange and to the ring;
a reel cam; and
a plurality of rollers mechanically attached to the reel cam, wherein the ring slides on a side of the rollers.

4. A harvester as claimed in claim 3, wherein the means for disengaging the fruits from the vines, comprises:
a shaker brush;
means for shaking the shaker brush;
means for rotating the shaker brush;
a plurality of rigid parallel feeder bars, for feeding the fruits and vines into the shaker brush, wherein the parts of the feeder bars that engage with the shaker brush are substantially straight; and
a plurality of parallel shaker bars for supporting vines engaged with the shaker brush.

5. A harvester as claimed in claim 3, further comprising, a blower for blowing air under the means for disengaging the fruits.

6. A harvester as claimed in claim 5, further comprising, means for pulling vines blown by the blower.

7. A harvester, for harvesting and separating fruits from vines, comprising:
means for cutting the vines;
means for disengaging the fruits from the vines;
means for supporting the vines under the disengaging means, wherein some of the fruit and vines are able to pass through the means for supporting;
a first conveyor for conveying the fruit which pass through the means for supporting, and wherein the first conveyor is below the means for supporting;
a blower for directing air between the means for supporting and the first conveyor; and
means for pulling vines below by the air from the blower.

8. A harvester, as claimed in claim 7, further comprising:
a separation conveyor;
means for moving vines from the means for supporting the vines to the separation conveyor;
means for causing fruit on the separation conveyor to pass through the separation conveyor; and
a fruit conveyor for collecting fruit which pass through the separation conveyor and conveys the fruit to below the means for supporting the vines.

9. A harvester, as claimed in claim 8, wherein the means for pulling vines comprises a pinch roller below the fruit conveyor.

10. A method for harvesting and separating fruits from vines, comprising the steps of:
cutting the vines;
disengaging the fruits from the vine;
conveying the fruits and vines on a separation conveyor under an agitator with tines, with the conveying being in a first direction at a first velocity;
inserting the tines into the vines wherein the tines at a first point travel through the vines at a velocity in the first direction different than the first velocity, causing the vines to separate, allowing some of the fruit to pass through the separation conveyor.

11. A method as claimed in claim 10, wherein the inserting of the tines, comprises the steps of;
moving the tines with a positive velocity component in the downward direction, and wherein the tines have a velocity component in the first direction which is less than the first velocity;
moving the tines with a vertical velocity component which is substantially equal to zero, and wherein the velocity component in the first direction is greater than the first velocity; and
moving the tines with a negative velocity component in the downward direction, and wherein the tines have a velocity component in the first direction which is less than the first velocity.

12. A method as claimed in claim 11, wherein the step of moving the tines with a positive velocity component in the downward direction, moves the tines with a velocity component in the first direction which is substantially zero, and wherein the step of moving the tines with a negative velocity has a velocity component in the first direction which is substantially zero.

13. A method as claimed in claim 12, wherein the step of moving the tines with a vertical velocity component which is substantially equal to zero, the velocity component in the first direction is greater than twice the first velocity.

14. A method as claimed in claim 11, further comprising the steps of:
catching the fruit that passes through the separation conveyor;
conveying the caught fruit on a fruit conveyor;
blowing air towards the caught fruit to remove vines mixed with the caught fruit; and
pulling vines blown by the blower from the system.

15. A method as claimed in claim 14, wherein the step of disengaging the fruits from the vine, comprises the steps of:
rotating a shaker brush;
shaking the shaker brush;
feeding the fruits and vines along a linear path to the shaker brush; and
supporting the fruits and vines as they travel under the shaker brush.

* * * * *